March 7, 1967 E. R. HOYT 3,307,440
STRIP CUTTING AND PACKING MACHINE FOR
MANUFACTURING CELLULAR CORE
Original Filed April 15, 1963 2 Sheets-Sheet 1
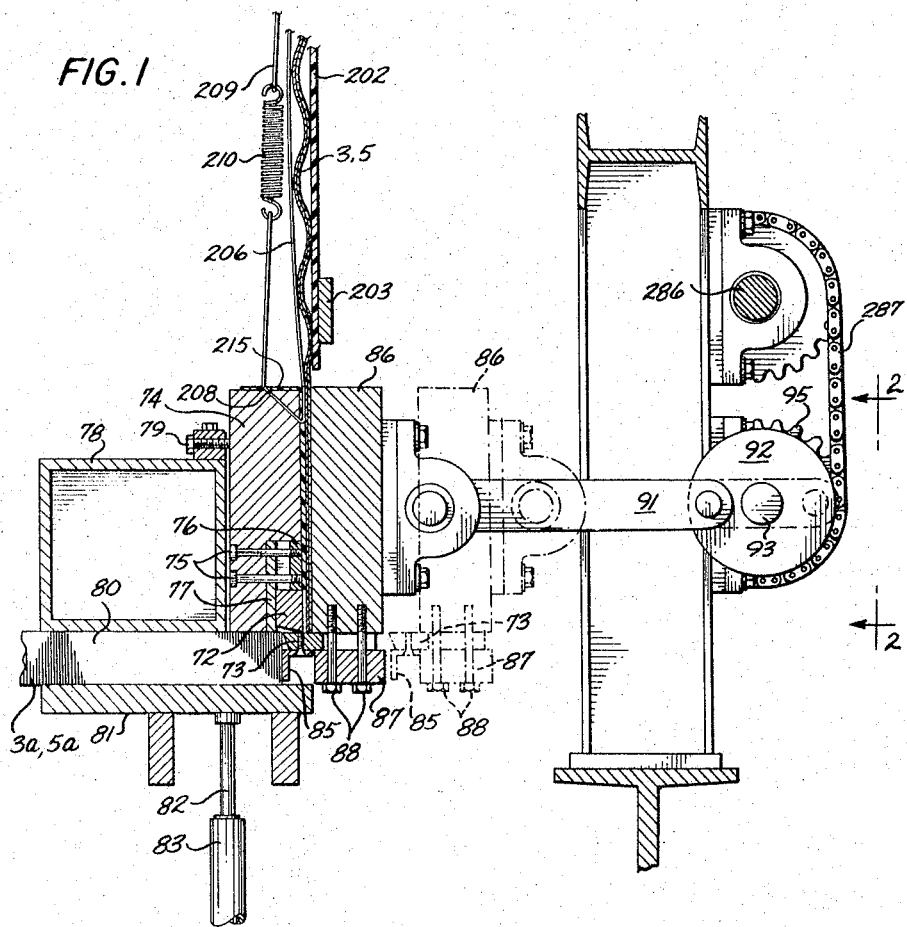
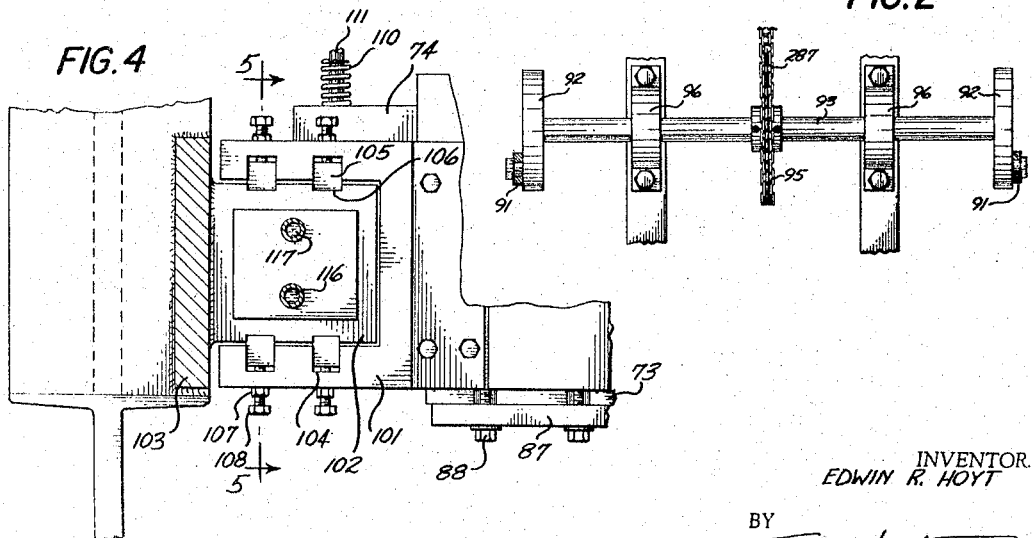
INVENTOR.
EDWIN R. HOYT
BY Townsend and Townsend
ATTORNEYS March 7, 1967  E. R. HOYT  3,307,440
STRIP CUTTING AND PACKING MACHINE FOR
MANUFACTURING CELLULAR CORE
Original Filed April 15, 1963  2 Sheets-Sheet 2
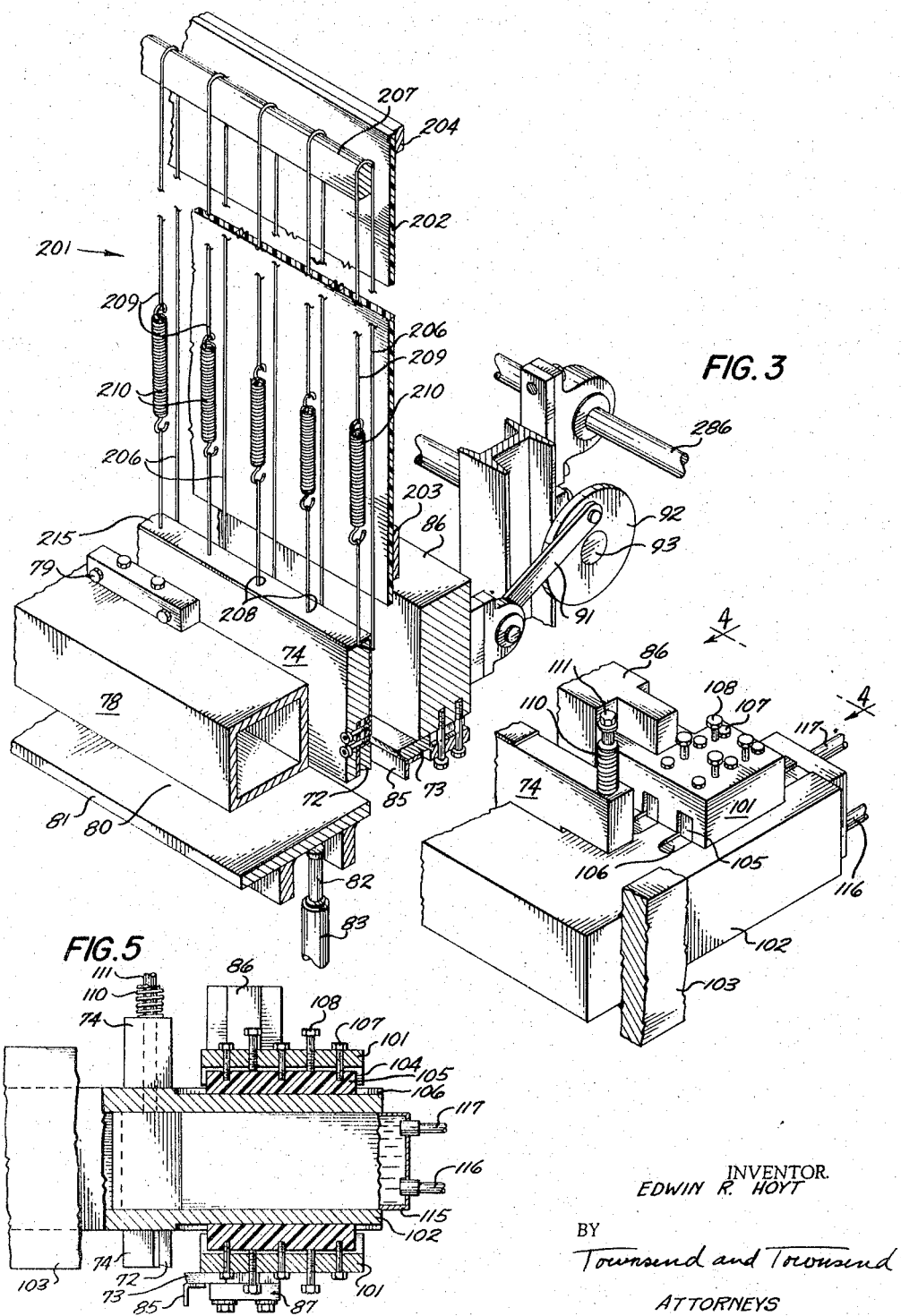
INVENTOR.
EDWIN R. HOYT
BY
Townsend and Townsend
ATTORNEYS United States Patent Office 3,307,440
Patented Mar. 7, 1967

3,307,440
STRIP CUTTING AND PACKING MACHINE FOR MANUFACTURING CELLULAR CORE
Edwin R. Hoyt, Centralia, Wash., assignor, by mesne assignments, to Hexcel Products Inc., Berkeley, Calif., a corporation of California
Original application Apr. 15, 1963, Ser. No. 273,244, now Patent No. 3,257,253, dated June 21, 1966. Divided and this application Feb. 12, 1965, Ser. No. 449,346
5 Claims. (Cl. 83—170)

This application is a division of my copending application Serial No. 273,244, filed April 15, 1963, now U.S. Patent No. 3,257,253, issued June 21, 1966, which application is a continuation-in-part of my copending application Serial No. 181,624, filed March 22, 1962.

This invention relates to production of cellular core and panel.

The invention of this application is primarily concerned with a strip cutting and packing machine for a cellular core manufacturing process and machine as described in detail in the above-mentioned U.S. Patent No. 3,257,253.

The strip cutting and packing machine includes a strip packing throat having an upper and a lower plate spaced apart to form the throat and an entrance thereto, means for feeding a web of material across the entrance to the throat and a cutter for severing strips from the leading end of the web material and packing the cut strips in the throat. The cutter includes a stationary cutter blade resiliently mounted for slight movement transversely of the throat and a reciprocating cutter blade mounted for cutting movement relative to the stationary blade and into and out of the throat. The stationary blade is provided with the major portion of its length disposed partially across the entrance to the throat and in the path of the reciprocating blade with one end canted slightly forward from the throat. The forward end of the stationary blade is clear of the reciprocating blade so that the reciprocating blade will cut the transverse strips from the web with a scissors action having a single sliding point of contact with the stationary blade which moves the stationary blade clear of the throat.

This construction permits rapid cutting of successive strips from the leading end of the web of material with the strips cut to uniform dimensions.

The invention will be better understood and the foregoing and additional objects and advantages will become apparent from the following detailed description of the machine illustrated in the accompanying drawings. Various changes may be made, however, in the construction and arrangement of parts and certain parts may be used without others with corresponding variation in the steps of the process. All such modifications within the scope of the appended claims are included in the invention. All references to specific dimensions are given by way of example only and are not intended in a limiting sense.

In the drawings:

FIGURE 1 is a fragmentary elevational sectional view of the strip cutter and web take-up;

FIGURE 2 is a fragmentary rear view of the strip cutter crankshaft taken on the line 2—2 of FIGURE 1;

FIGURE 3 is a fragmentary isometric view of the web take-up and strip cutter with parts broken away;

FIGURE 4 is a fragmentary elevational view of the crosshead bearing support for the movable cutter, with parts in section, taken on the line 4—4 of FIGURE 3; and FIGURE 5 is a sectional view taken on the line 5—5 of FIGURE 4.

The present invention is directed to a strip cutting and packing machine for a honeycomb or cellular core making machine shown in detail in the aforementioned U.S. patent and in which webs of material are lined with adhesive, combined, and driven to a strip cutting region of the machine wherein the leading end of the combined webs is stopped and ribbons of material of uniform dimension cut therefrom.

As shown in FIGURES 1 and 3, the combined core stock webs 3, 5 move vertically downward from between the powered constant speed nip rolls (not shown) a distance of about four feet to the strip cutter 71 which is cyclically operated. The cyclic operation of the cutter requires a takeup for the slack in the webs resulting from their momentary stoppage during each cutting cycle. This distance between the nip rolls and cutter is utilized for a takeup mechanism which is hereinafter described.

As shown in FIGURES 1 and 3, the core strip cutting mechanism has a fixed cutter blade 72 with a horizontal cutting edge and a cooperating blade 73 with a vertical cutting edge that is reciprocated so that the edges of the blades are passed one with respect to the other in cutting relationship. Each of the blades extends transversely of the machine frame and across the webs as they move downward between the blades. The fixed blade is mounted on a rigid mounting plate beam 74 that extends transversely of the machine and is supported at its ends by the frame of the machine. Mounting plate 74 is provided with a recess in its rearward bottom corner to receive the blade 72. The blade is secured by cap screws 75 threaded into a plate 76 attached to the top edge of the blade. The cap screws draw the blade against a wedge shim 77, the purpose of which will be presently described. Mounting plate 74 is backed up by a horizontal box beam 78 on the frame of the machine which has set screws 79 bearing against the rear side of the mounting plate. The bottom surface of mounting plate 74 forward from the blade 72, and the bottom surface of beam 78, form the top face of the entrance portion of a horizontal throat 80 that contains the strips severed from the combined webs. The rest of the top face of the throat is formed by a top throat plate (not shown).

This throat 80 may be called the packer throat as the strips are packed therein to give contact therebetween while the adhesive is given time to set. The bottom face of the packer throat is formed by a horizontal plate 81 that is in opposition to the aforementioned top face of the throat and spaced therefrom the width of the severed strips. This bottom plate 81 of the throat extends rearward of the top face a distance sufficient to provide a stop for the cut edge of the combined core webs 3, 5 as they are fed downwardly from the nip rolls and the second adhesive applicator. Thus, the bottom plate 81 also serves as a gauge for determining the width of the strip to be severed from the core web.

Bottom plate 81 is mounted for vertical adjustment on a series of screws 82 which have threaded engagement with supporting cylinders 83. The screws are adjusted to set the strip width whereby a drag is exerted on the strips in the throat so that they will be firmly packed together. This packing of the strips is accomplished by the movable blade 73 and a packer bar 85 mounted on the underside of the blade. The blade and packer bar are clamped against the underside of a rigid crosshead beam 86 by means of a clamp bar 87 and screws 88 which pass through slots in the blade.

The crosshead 83 is reciprocated by a pair of spaced-apart connecting rods 91 each pivotally connected at its forward end with the rear face of the crosshead. The rearward ends of the connecting rods are connected with crank pins on crank discs 92 which are mounted on opposite ends of a crankshaft 93. The crankshaft is driven by a sprocket 95 for rotation in bearings 96. (See FIGURES 1, 2 and 3.)

Each end of crosshead 86 is supported by a U-shaped slide block 101 which straddles a short, longitudinal, horizontal supporting rail 102 mounted on and projecting inwardly from a side frame member 103 of the machine as best shown in FIGURES 3 and 4. The upper and lower arms of block 102 are slotted at 104 to receive bearing members 105 of suitable material such as nylon. Bearing members 105 ride in grooves 106 in the top and bottom surfaces of rail 102 and are secured in the slots 104 by screws 107 which permit relative vertical movement, height adjustment being obtained by pressure adjusting screws 108 in FIGURE 5. This permits the ends of the crosshead 86 and, hence, the blade 73 to be adjusted vertically in the proper cutting relationship with stationary blade 72. The slots 104 and grooves 106 prevent longitudinal movement of the crosshead and blade 73 in a direction transversely of the machine.

Mounting plate 74 has notched ends overhanging and resting on the rails 102 as shown in FIGURE 3. The mounting plate is biased downward by springs 110 on upstanding screw studs 111 which pass loosely through the mounting plate and are threaded into the rails 102. Thus, the rails 102 are the vertical positioning elements for both blades 72 and 73 which have a novel relationship as will presently be explained.

In order to prevent overheating of the bearing members 105, each rail 102 is made hollow to contain therewithin a cooling chamber 115. Pipe connections 116 and 117 provide for circulating a cooling liquid through the chambers. This arrangement permits the slide bearings to operate without added lubricant which helps to keep the core strips clean and reduces maintenance on the machine. In some end uses of the honeycomb the core strips are exposed to view and must present a neat and clean appearance.

The stationary blade 72 is almost normal to the direction of motion of the movable blade but not quite as one end of the stationary blade should be contacted first by the moving blade so that severing of a strip from the combined webs takes place with a scissors-like shearing action, the cutting being done at a point which moves along the blades. This shear angle of the stationary blade from the normal is about one-sixteenth inch to one-eighth inch from end to end of a six foot blade and is attained by the taper of the wedge shim 77 which is interposed between the blade 72 and its mounting plate 74. This is to say that one end of the stationary blade is slightly forward from its opposite end. The under surface of the stationary blade has a little rake rearward from its cutting edge and the forward surface of the moving blade has a little rake downward from its cutting edge which is in the plane of its upper surface.

The moving blade and its bed plate are adjusted so that they will enter the packing throat and the blade edge will just clear the under face of the top face of throat 80. The fixed blade is then adjusted so that the blades will shear a strip from the combined webs 3, 5 when they are between the blades' edges and the end edges of the webs are in contact with the bottom plate 81.

Another novel feature of the blade relationship to obtain a scissors action is that the stationary blade 72 can slope slightly along its length. Its rearwardly extending end is from one-sixteenth inch to one-eighth inch higher than its forwardly extending end, the rearward end having its cutting edge spaced about one thirty-second inch above the moving blade so that first contact between the blades occurs about two inches in from the end of the blades, before the moving blade makes cutting engagement with the edge of the web. The major portion of the length of the stationary blade is then slightly below the cutting edge of the moving blade. This vertical adjustment of the stationary blade is obtained by the insertion of shims under the notched supporting ends of mounting plate 74.

As the reciprocating blade 73 moves forwardly it first passes freely under the rearward and upper edge of the stationary blade and then makes contact with the stationary blade at the horizontal juncture of the two blades and starts to cut the paper web at this end of the blades. Further forward movement of the reciprocating blade raises the stationary blade and mounting plate against the force of spring 110 causing the contact point between the two blades to move along the blades and cut the web with the desired scissors action. Thus the entire thrust of the reciprocating blade is applied at one point of cutting instead of along the entire line of cut.

Rotation of the crankshaft 93 reciprocates the movable blade 73 which acts to sever strips from the end of the combined core stock webs as they are fed downwardly from the nip rolls. The forward face of each composite strip will have applied thereto vertical adhesive lines from the second applicator 42 and as each severed strip is pushed into the packer throat 80 it will come into back-to-face contact and congruent registry with the previously severed composite strip and be adhered thereto. This results in the packer throat being filled and packed with such strips in registry and adhered together as shown in FIGURE 1.

The throw of the crank discs is such, and the crosshead and its blade are so located, that after a strip is cut the blade 73 and packer bar 85 enter the packer throat far enough so that any spring back of the strip pack will not return the strip to interfere with the feeding of the web end against the lower packer plate 81 upon return of the crosshead to separate the blades' edges. Further, the spring back is limited by the dropping of the stationary blade partially behind the upper edge of the strip pack as the moving blade is withdrawn, thus holding the strip pack within the throat.

As a strip is cut from the web, the new end of the web rides on the upper face of the moving blade 73 and then when the blade withdraws the end of the web moves down to plate 81 which serves as a gauge plate for the next cutting operation. It is to be remembered that the two webs 3, 5 are in adhesion along longitudinal, spaced-apart parallel vertical lines from the applicator (not shown) as the strips are severed therefrom and, hence, each severed strip is composed of two individual web portions and these lines of web adhesion are spaced laterally between the external lines of adhesive from the applicator which adheres the successive cuttings together in the packer throat. The packing of the strips one at a time in the packer throat produces a good bond with less adhesive than is required for the conventional method of pressing a large stack of glue lined sheets prior to cutting the strips.

The combined core stock webs 3, 5 move vertically downward from between the constant speed powered nip rolls a distance of about four feet to the cylically operated strip cutter 71. This cyclic operation of the cutter requires a take-up for the slack in the web resulting from its constant speed at the nip rolls and its momentary stoppage during cutting cycles. The adhesive line applicator is just below the nip rolls, and between the applicator and the cutter is a take-up 201 for this web slack, as best shown in FIGURE 3.

As cutter speeds may exceed a hundred cycles per minute, it is necessary that any moving parts in the take-up be as light as possible and highly responsive to slack in the combined webs. Further, the forward face of the combined webs has adhesive lines thereon. With these considerations in mind, there has been formed between the applicator and the cutter a flexible and resilient vertical throat for the passage therethrough of the combined webs. This throat acts as a take-up because of its resiliency.

The throat has a rearward side in the form of a fixed plate 202 that extends transversely of the machine and from the backup roll of the applicator (not shown) to a lower end which just clears the crosshead 86. The forward face of the plate 202 is contiguous with the rearward face of the web 3 in its vertical run from the nip rolls. Bars 203, 204 extend transversely of the machine and are secured to the plate and the frame of the machine to support the plate 202 in this position.

Forward of the combined webs is a series of spaced-apart parallel cords each of which has a portion 206 thereof in a vertical run which is contiguous or slightly spaced from the webs. Each of the cords passes over a cord bar 207 placed transversely of and secured to the frame of the machine just below the applicator discs (not shown). Also, each of the cords passes through a separate opening 208 in the top of the mounting plate 74. This opening slants downwardly so as to emerge from the rear face of the mounting plate above the blade 72. The ends of each cord form another approximately vertical run 209 and the ends are joined together by the coiled tension spring 210.

The top edge of the cord bar 207 should be rounded and smooth so that springs 210 will have no difficulty in tensioning both runs 206, 209 of the cords evenly. The cords are spaced two to four inches apart and the spacing is such that each cord is located between adjacent adhesive lines on the face of the web. It is this series of cord runs 206, 209 and their springs 210 that provides the resiliency to the take-up throat formed by the cords and plate 202.

Whenever travel of the web in the take-up 201 is interrupted by the end of the combined web contacting the bottom plate 81 of the packer and then contacting the top surface of the movable blade 73 as a new end is cut on the web, the web continues to feed into the take-up from the nip rolls and the applicator. As the web feeds into the take-up with the end thereof stopped, the portion of the web above the fixed blade and its support forms a series of transverse waves which increase in height and often in number as the web continues to feed into the take-up. These web waves force the spring tensioned cord runs 206 contacting the web away from the fixed plate 202, as shown in FIGURE 1.

Then when the movable blade 73 and its support return out of the packer throat and the web can again feed past the blade edges, the tension of the cords forces out the waves in the web in the take-up to effect the feed past the cutter blades and against the bottom plate stop 81. The cords are tensioned to effect the above described action. This feeding action by the take-up is very fast and is a factor in the high speed strip cutting obtainable with the present machine. The width of the strips cut from the web, or distance between cuts, times the speed, or cycles of the cutter, determines the peripheral speed of the nip rolls, and this relationship is fixed by the machine's drive means to the various parts.

It is to be noted that the free face adhesive lines from the applicator are so spaced apart on the forward web face in the take-up 201 that the cords 206 are between the lines, and that these cords extend to a point a short distance above the fixed cutter blade. This arrangement prevents any contact between the adhesive lines and the cords, and the cords keep the adhesive lines from contact with the cord bar and most of the beam 74 and fixed blade 72. The arrangement also keeps the combined web moving freely to the cutter blades as adhesive from the web does not transfer therefrom to parts of the machine. The little that is transferred to the blade edges soon reaches a maximum amount so that as some transfers to the edges an equal amount is carried therefrom by the web and severed strips. This amount that accumulates on the blade edges is not enough to appreciably widen or smear the lines applied to the web by the applicator. Preferably, the rear face of mounting plate 74 is covered with a smooth plastic sheet 215 to reduce sliding friction, prevent adhesive accumulation and facilitate cleaning off any adhesive that may accumulate on this surface.

Having thus described the various features of my invention, the process, the products, a machine for the performance of such process for the production of such products, and examples of the use of such products.

I claim:

1. A cutter for continuous web material comprising a pair of laterally spaced parallel rails, a stationary blade having a cutting edge substantially parallel with the plane of said rails and supported at its ends on said rails, a movable blade having a cutting edge cooperating with said stationary blade and supported at its ends for sliding movement on said rails, and means to reciprocate said movable blade, said movable blade being supported on plastic bearing members and said rails containing chambers therewithin for a circulating cooling medium.

2. A scissors action web shear comprising a pair of laterally spaced parallel rails, a transverse reciprocating blade mounted for sliding movement on said rails, a transverse mounting plate supported for slight movement perpendicular to the plane of said rails, and a stationary blade secured to said mounting plate in a position slightly inclined to and intersecting the plane of movement of the reciprocating blade, one end of said stationary blade being clear of and canted toward the reciprocating blade for initial contact therewith at a single point which moves along the blades as the reciprocating blade advances.

3. A scissors action web shear comprising a stationary blade and a reciprocating blade cooperating therewith, said stationary blade being resiliently mounted for slight movement perpendicular to the plane of reciprocation of the reciprocating blade, the cutting edge of said stationary blade being approximately parallel with the cutting edge of said reciprocating blade but canted in two directions with said cutting edge of said stationary blade slightly inclined to said one plane of reciprocation and with one end of said cutting edge of said stationary blade slightly closer to the reciprocating blade than the other and intersecting the plane of movement of the reciprocating blade so that said cutting edges make contact in a single sliding point which moves along the blades from end to end.

4. In a honeycomb machine, a packer throat, a stationary cutter blade resiliently mounted for slight movement transversely of said throat, a reciprocating cutter blade mounted for cutting movement relative to said stationary blade and into and out of said throat, and means for feeding a web of material across the entrance to the throat and between said blades when the blades are separated, said stationary blade having the major portion of its length disposed partially across the entrance to said throat and in the path of said reciprocating blade with one end canted slightly forward from said throat, said forward end being clear of the reciprocating blade so that the reciprocating blade will cut transverse strips from said web with a scissors action having a single sliding point of contact with the stationary blade, moving the stationary blade clear of said throat and packing the strips into the throat behind the stationary blade.

5. In a honeycomb machine, a packer throat, a resiliently mounted stationary cutter blade arranged at the entrance to said throat to retain cut honeycomb strips in the throat, means for feeding a web of material across the entrance to the throat, and a reciprocating cutter blade cooperating with said stationary blade to cut transverse strips from said web and pack them in the throat behind said stationary blade, said blades being canted relative to each other with a portion of said stationary blade lying in the path of movement of the reciprocating cutter blade when the blades are disengaged so that during engagement of the blades contact is made at a single sliding point in a scissors action and said stationary blade is moved on its resilient mounting.

(References on following page)

References Cited by the Examiner

UNITED STATES PATENTS

| | | | |
|---|---|---|---|
| 432,108 | 7/1890 | Anderson | 83—700 X |
| 799,890 | 9/1905 | Claus | 83—365 X |
| 2,169,614 | 8/1939 | Peck | 83—635 |
| 2,361,052 | 10/1944 | Patterson | 83—96 |
| 2,697,488 | 12/1954 | Stempel | 83—96 |
| 3,131,589 | 5/1964 | Hazeltine et al. | 83—635 |
| 3,218,918 | 11/1965 | Brindley et al. | 83—583 X |

FOREIGN PATENTS

| | | |
|---|---|---|
| 537,488 | 5/1955 | Belgium. |
| 814,591 | 3/1937 | France. |

WILLIAM W. DYER, Jr., *Primary Examiner.*

ANDREW R. JUHASZ, JAMES M. MEISTER,
*Examiners.*